United States Patent
Capurso et al.

(10) Patent No.: US 8,401,014 B2
(45) Date of Patent: Mar. 19, 2013

(54) METHOD FOR TRANSMITTING DATA PACKETS WITH DIFFERENT PRECEDENCE THROUGH A PASSIVE OPTICAL NETWORK

(75) Inventors: Alessandro Capurso, Turin (IT); Roberto Mercinelli, Turin (IT); Marcello Valentini, Turin (IT); Maurizio Valvo, Turin (IT)

(73) Assignee: Telecom Italia S.p.A., Milan (IT)

( * ) Notice: Subject to any disclaimer, the term of this patent is extended or adjusted under 35 U.S.C. 154(b) by 968 days.

(21) Appl. No.: 12/084,243

(22) PCT Filed: Oct. 31, 2005

(86) PCT No.: PCT/EP2005/055654
§ 371 (c)(1),
(2), (4) Date: Apr. 23, 2009

(87) PCT Pub. No.: WO2007/051488
PCT Pub. Date: May 10, 2007

(65) Prior Publication Data
US 2009/0252494 A1    Oct. 8, 2009

(51) Int. Cl.
*H04L 12/28*    (2006.01)
(52) U.S. Cl. ........................................................ 370/392
(58) Field of Classification Search ............... 398/98, 398/25, 54, 198
See application file for complete search history.

(56) References Cited

U.S. PATENT DOCUMENTS

| | | | |
|---|---|---|---|
| 6,438,128 B1 * | 8/2002 | Kashyap | 370/389 |
| 2004/0184450 A1 | 9/2004 | Omran | |
| 2004/0202470 A1 * | 10/2004 | Lim et al. | 398/51 |
| 2004/0208631 A1 * | 10/2004 | Song et al. | 398/168 |
| 2005/0008013 A1 | 1/2005 | Jamieson et al. | |
| 2005/0068914 A1 * | 3/2005 | Lee et al. | 370/312 |
| 2007/0058974 A1 * | 3/2007 | Krimmel | 398/63 |
| 2007/0264017 A1 * | 11/2007 | Mizutani et al. | 398/72 |
| 2008/0253770 A1 * | 10/2008 | Mori | 398/59 |

FOREIGN PATENT DOCUMENTS

| | | |
|---|---|---|
| CN | 1601982 A | 3/2005 |
| EP | 1 467 590 A1 | 10/2004 |

* cited by examiner

*Primary Examiner* — Jessica Stultz
*Assistant Examiner* — Tuan Nguyen
(74) *Attorney, Agent, or Firm* — Finnegan, Henderson, Farabow, Garrett & Dunner, L.L.P.

(57) ABSTRACT

A method of transmitting data packets through a passive optical network. The method includes: receiving a first data packet from a first interface of the passive optical network, the first data packet including precedence information; encapsulating the first data packet in a second data packet at the first interface; and transmitting the second data packet through the passive optical network toward a second interface, wherein encapsulating includes inserting in a header field of the second data packet a value indicative of the precedence information. The value indicative of the precedence information could include a priority and/or a virtual LAN identifier.

13 Claims, 6 Drawing Sheets

METHOD FOR TRANSMITTING DATA PACKETS WITH DIFFERENT PRECEDENCE THROUGH A PASSIVE OPTICAL NETWORK

CROSS REFERENCE TO RELATED APPLICATION

This application is a national phase application based on PCT/EP2005/055654, filed Oct. 31, 2005, the content of which is incorporated herein by reference.

BACKGROUND OF THE INVENTION

1. Field of the Invention

The present invention generally relates to the field of telecommunication networks and, in particular, to the field of optical access networks. More in particular, the present invention relates to a method and apparatus for transmitting data packets, in particular Ethernet packets, with different precedence through a passive optical network, for instance a GPON. Finally, the present invention relates to a telecommunication system.

2. Description of the Related Art

As it is known, an access network is a telecommunication network adapted to connect one or more users to a packet switched network.

In particular, an optical access network is an access network comprising optical fibers, active optical components (amplifiers, regenerators, switches and the like) and/or passive optical components (couplers, splitters, and the like). Different types of optical access networks are known in the art: aggregated point-to-point networks with a single channel for optical fiber, aggregated multi-channel point-to-point networks, spatially distributed WDM network, etc.

A passive optical network is a particularly advantageous type of optical access network. Such a passive optical network mainly comprises passive optical components, arranged according to a point-to-multipoint architecture, thus allowing to connect a plurality of users to a single node of a packet-switched network.

Typically, a passive optical network comprises one or more optical trees, each optical tree comprising single-mode optical fiber spans which are connected by splitters and couplers.

The roots of the optical trees are connected to an optical line termination, which acts as a network-side interface for the passive optical network. The optical line termination is typically connected to a node of the packet-switched network.

Each leaf of each optical tree is connected to a respective optical network unit, which acts as a user-side interface for the passive optical network. An optical line termination may be connected through a passive optical network to a number of optical network units. Each optical network unit is connected to a number of users.

In a passive optical network, data packets may be transmitted either from the packet-switched network to a user (downstream), or from a user to the packet-switched network (upstream). Downstream data packets may be addressed to a single user (unicast), to more than one user (multicast), or to all the users connected to an optical line termination (broadcast).

Typically, a downstream data packet is received from the packet-switched network at the optical line termination, which encapsulates it in an encapsulation frame, as it will be described in greater detail herein after. The optical line termination then transmits the encapsulation frame across an appropriate optical tree of the passive optical network. The encapsulation frame is thus received by all the optical network units connected to said optical tree. Each optical network unit determines whether the received encapsulation frame is addressed to one of its users, as it will be explained in further detail herein after. In the affirmative, the data packet is extracted from the encapsulation frame, and it is forwarded towards the target user.

Similarly, each optical network unit receives one or more upstream data packets from its user(s). Each optical network unit encapsulates such data packets in respective encapsulation frames, as it will be explained in greater detail herein after, and it transmits such encapsulation frames across the passive optical network. Each optical network unit is associated to a respective transmission period, so that encapsulation frames from different optical network units are TDMA multiplexed. Upon reception of such multiplexed encapsulation frames, the optical line termination extracts all the data packets from the respective encapsulation frames, and it forwards them to the packet-switched network.

Different types of optical passive networks are known in the art, such as ATM Passive Optical Networks (APON), Broadband Passive Optical Networks (BPON), Ethernet Passive Optical Networks (EPON) and Gigabit Passive Optical Networks (GPON). Each type of passive optical network is adapted to support transmission of different types of packet-switched traffic, at different speeds.

In particular, the GPON passive optical network (or briefly GPON network, in the following description), which is defined by the Recommendation Series ITU-T G984.x, allows to transport voice, data and video traffic coming from/addressed to any type of packet-switched network (Ethernet, MPLS, IP, etc.), at speeds up to 2.5 Gbit/s.

As described by Recommendation ITU-T G.984.3, a GPON network supports both:

ATM encapsulation; and

GEM encapsulation ("GPON Encapsulation Mode").

In particular, GEM encapsulation provides for inserting an upstream or downstream data packet, independently from its format and size, into the payload of a GEM frame. Such a GEM frame comprises, in addition to the payload, a header. Such a header comprises several fields, including a Port Identifier (or Port-ID). The Port-ID field, whose size is typically 12 bits, may comprise information about destination (downstream) or source (upstream) of a GEM frame. Each optical network unit may be associated to one or more values of the Port-ID field.

Thus, for instance, when an optical line termination encapsulates a downstream data packet in a GEM frame, it inserts into the Port-ID field one of the values associated the optical network unit to which the destination user of such a downstream data packet is connected.

When an optical network unit receives such a GEM frame, it checks whether the Port-ID field comprises one of its own associated values. In the affirmative, the optical network unit extracts the data packet from the GEM frame and forwards it to the user; otherwise, the optical network unit discards such a received GEM frame.

As already mentioned, a GPON network is capable of transporting different types of data packets. In particular, a GPON is capable of transporting Ethernet packets.

As it is known, an Ethernet packet comprises data and a header with several fields. Among these fields, for instance, there is a Destination Address field, which typically comprises the MAC address of the user which the Ethernet packet is addressed to.

Optionally, an Ethernet packet may be "VLAN tagged", as defined by the Recommendation IEEE 802.1Q, Chapter 9. A VLAN tagged Ethernet packet comprises, in its Ethernet header, an additional VLAN header, which comprises a first field which is called VLAN Identifier and a second field which is called priority.

More particularly, the VLAN Identifier field, whose length is 12 bits, identifies the Virtual LAN to which the Ethernet packet is associated. Ethernet packets addressed to a same user may be tagged with the same VLAN Identifier value (VLAN tagging per user); otherwise, Ethernet packets providing the same service may be tagged with the same VLAN Identifier value (VLAN tagging per service).

The priority field, whose length is typically 3 bits, comprises the priority value of the Ethernet packet, which ranges from 0 to 7 (0 being the lowest priority, 7 being the highest priority).

The VLAN header is then 15 bit-long, and it allows a service provider to provide services with different Quality of Service through an Ethernet network. In other words, the VLAN header is indicative of the Ethernet packet precedence, i.e. of the precedence according to which the Ethernet packet has to be handled by a node.

SUMMARY OF THE INVENTION

In the following description and in the claims, the term "precedence" will indicate a value associated to a data packet, which may comprise one or more information (for instance priority and/or VLAN identifier, in case of Ethernet packets), which indicates the precedence according to which such a data packet must be handled by a node.

As already mentioned, Ethernet packets may be transported over a GPON network by means of GEM encapsulation.

According to the above cited Recommendation ITU-T G.984.3, GEM encapsulation allows to transmit different GEM frames with different bandwidth assurances. More particularly, GEM frames are divided into a number of Transmission Containers, each Transmission Container being associated to a different level of bandwidth assurance. Five different types of Transmission Containers are presently provided:

Type 1: Fixed Bandwidth;
Type 2: Assured Bandwidth;
Type 3: Assured Bandwidth, Non-Assured Bandwidth and Maximum Bandwidth;
Type 4: Best Effort Bandwidth; and
Type 5: any type of bandwidth.

GEM frames having different values of the Port-ID field may belong to a same Transmission Container Type. Both the optical line termination and the optical network units have the capability to determine the Transmission Container a GEM frame belongs to according to the value of its Port-ID field, so that each GEM frame can be handled with the appropriate bandwidth assurance.

Thus, in principle, resources (i.e. bandwidth) of a GPON network may be allocated to different GEM frames according to the Transmission Containers they belong to.

However, the Applicant has noticed that a GEM frame is not inserted in the appropriate Transmission Container according to the precedence of the data packet transported by the GEM frame.

In other words, data packets with different precedence are encapsulated in respective GEM frames, which may all belong to a same Transmission Container, independently from the precedence of the encapsulated data packets. This is due to the fact that GEM encapsulation is transparent. In other words, GEM encapsulation does not provide for processing format-specific information of the packet to be encapsulated, such as e.g. priority information and/or VLAN Identifier of an Ethernet packet.

Thus, at the input of a GPON network, all the GEM frames belong to a same Transmission Container, so that the GPON network is unable to distinguish between GEM frames transporting Ethernet packets with high and low precedence. Therefore, presently, the resources (i.e. the bandwidth) of a GPON network are equally shared between all the GEM frames.

However, the Applicant has noticed that, under certain conditions, such a mechanism is not suitable for efficiently transmitting Ethernet packets with different precedence, especially in the upstream direction.

In particular, the Applicant has noticed that, in case of congestion of the GPON network (i.e. actual traffic bandwidth close to the maximum capacity of the GPON network), the present GEM encapsulation does not provide any information for performing, in case of upstream GEM frames coming from different users, a bandwidth allocation which allows to transmit GEM frames containing higher precedence Ethernet packets with higher bandwidth assurance. In other words, in a congestion state, the higher level Quality of Service, which is typically associated to bandwidth assurance such as Fixed Bandwidth or Guaranteed Bandwidth, can not be guaranteed.

Therefore, the general aim of the present invention is providing a method for transmitting data packets (in particular, but non exclusively Ethernet packets) with different precedence through an optical access network (in particular, but non exclusively, a GPON passive optical network) which overcomes the aforesaid problems.

In particular, an object of the present invention is providing a method for transmitting data packets with different precedence through an optical access network which allows such an optical access network to distinguish between data packets with different precedence.

Advantageously, such a method would allow an optical access network to allocate bandwidth to data packets according to their precedence.

Besides, advantageously, such a method would allow to guarantee the Quality of Service to users or services requiring high bandwidth assurance levels such as Fixed Bandwidth or Assured Bandwidth, even in case of congestion states.

According to a first aspect, the present invention provides a method of transmitting a data packet through a passive optical network, the method comprising: receiving a first data packet from a first interface of the passive optical network, the first data packet comprising precedence information; encapsulating the first data packet in a second data packet at the first interface; and transmitting the second data packet through the passive optical network towards a second interface, wherein encapsulating comprises inserting in a header field of the second data packet a value indicative of the precedence information.

Preferably, resources of the passive optical network are allocated according to the value indicative of the precedence information.

According to an embodiment, the first packet is an Ethernet packet.

Advantageously, the precedence information may comprise priority of the first packet, virtual LAN identifier or both priority and virtual LAN identifier.

Advantageously, the second packet is a Gigabit passive optical network encapsulation mode frame and the value indicative of the precedence information is inserted into Port-Identifier field of the second packet.

According to a second aspect, the present invention provides a network interface apparatus for interfacing a packet switched network and a passive optical network. The apparatus comprises: a first port which is adapted to receive a first data packet from the packet switched network, the first data packet comprising precedence information; an encapsulating module which is adapted to encapsulate the first data packet in a second data packet; and a second port which is adapted to transmit the second data packet through the passive optical network. According to the invention, the encapsulating module is adapted to insert in a header field of the second data packet a value indicative of the precedence information.

The apparatus also preferably comprises a resource allocation module which is adapted to allocate resources of the passive optical network according to the value indicative of the precedence information.

Typically, the first packet is an Ethernet packet. The precedence information may comprise priority of the first packet, virtual LAN identifier of the first packet or both.

According to an embodiment, the second packet is a Gigabit passive optical network encapsulation mode frame and the value indicative of the precedence information is inserted into the Port-Identifier field of the second packet.

According to a third aspect, the present invention provides a transmission system comprising a packet-switched network, a plurality of users, a passive optical network, a first network interface apparatus for interfacing said packet-switched network and said passive optical network and a second network interface apparatus for interfacing said passive optical network and at least one of said plurality of users, wherein both said first network interface apparatus and said second network interface apparatus are as set forth above.

BRIEF DESCRIPTION OF THE DRAWINGS

The present invention will become more clear by the following detailed description, given by way of example and not of limitation, to be read with the accompanying drawings, wherein.

DETAILED DESCRIPTION OF THE INVENTION

Figure 1:
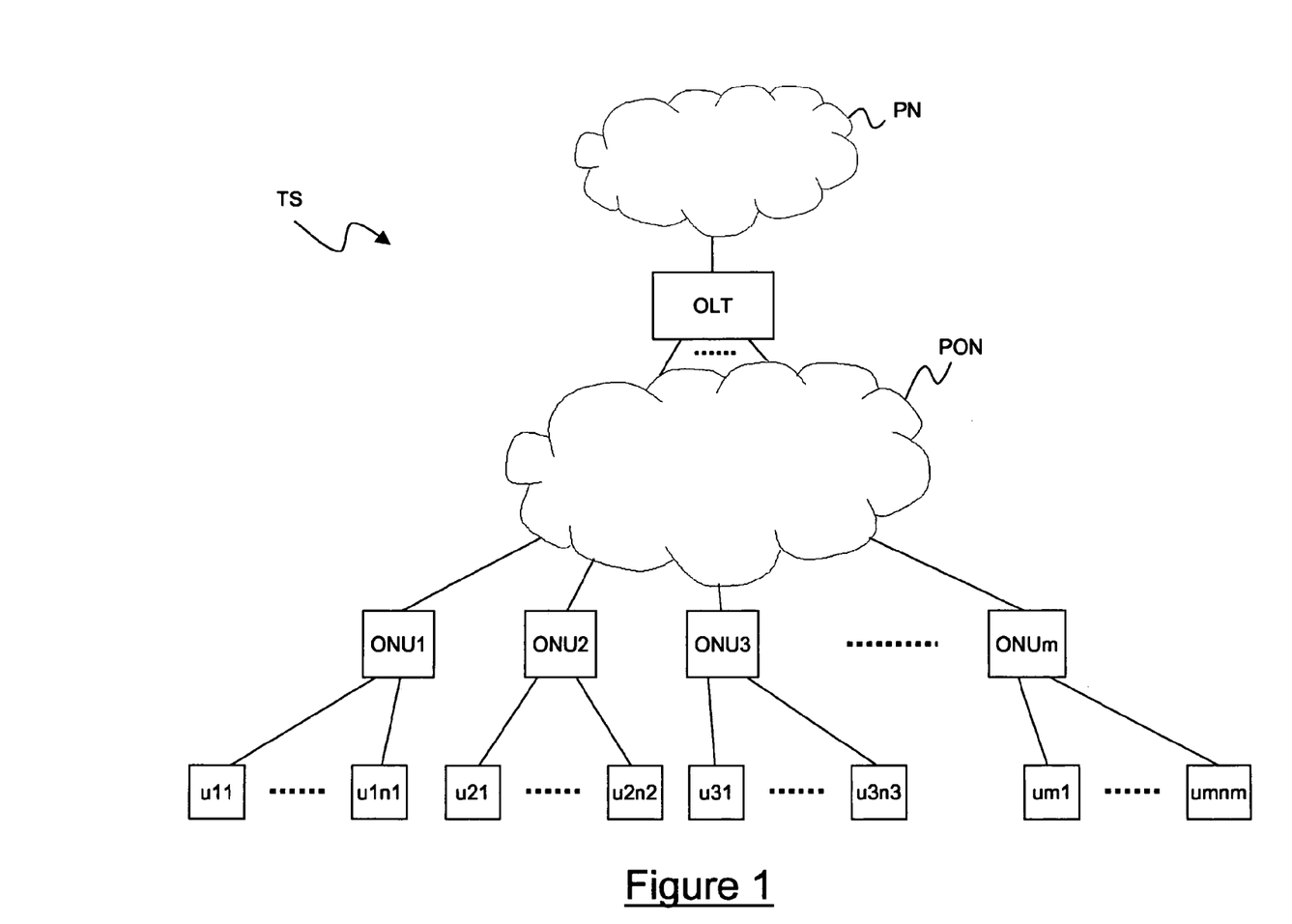
FIG. 1 schematically shows a telecommunication system comprising a passive optical network.

FIG. 1 schematically shows a transmission system TS comprising a passive optical network PON for providing a number of users u11, . . . u1n1, u21, . . . , u2n2, . . . , um1, . . . , umnm with optical access to a packet-switched network PN.

The packet-switched network PN is a packet-switched network, such as for example an Ethernet network, or an IP network.

Such a packet-switched network PN has a node (not shown) which is connected to an optical line termination OLT. In turn, the optical line termination OLT is connected to a passive optical network PON, as it will be explained in further detail herein after by referring to FIG. 2a.

As already mentioned, the passive optical network PON comprises k optical trees (not shown), where k≧1. The whole of the k optical trees has m leaves, each leaf being connected to a respective optical network unit ONU1, ONU2, ONU3, . . . ONUm.

In turn, the optical network unit ONU1 is connected to a first plurality of users u11, . . . u1n1; similarly, the optical network unit ONU2 is connected to a second plurality of users u21, . . . u2n2; and so on, until the optical network unit ONUm, which is connected to a $m^{th}$ plurality of users um1, . . . umnm.

By referring to FIG. 2a, the structure of the optical line termination OLT of FIG. 1 will be described in further detail. Optical line termination OLT is a network interface apparatus between the packet switched network PN and the passive optical network PON.

The optical line termination OLT comprises a network-side port npOLT which connects the optical line termination OLT to a node (not shown) of the packet-switched network PN. The optical line termination OLT further comprises a switching matrix SM, which is connected to the network-side port npOLT. The switching matrix SM has m output connections (either physical or logical), where m is still the number of optical network units connected to the optical line termination OLT.

Figure 2A:
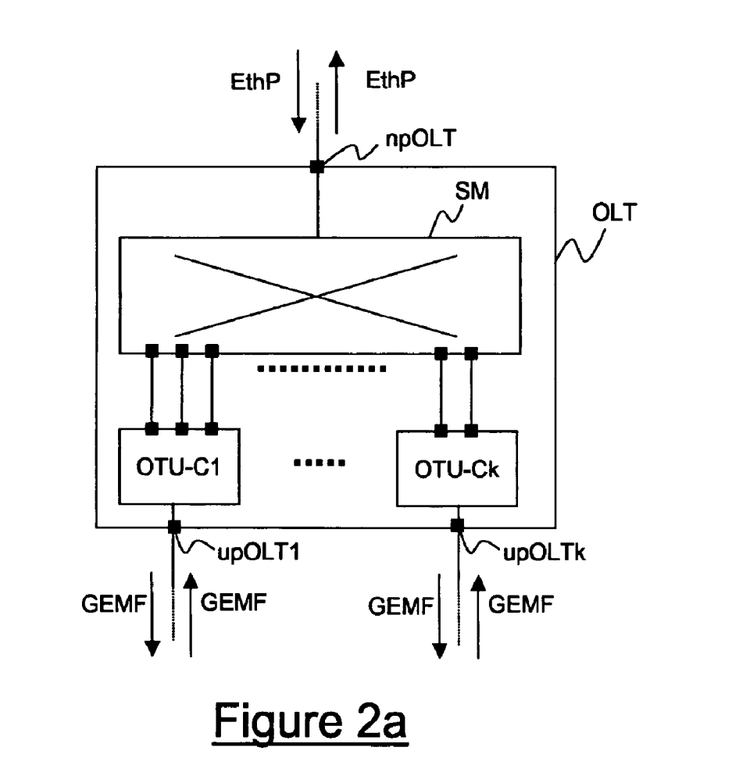
FIGS. 2a and 2b schematically show a possible structure of an optical line termination and of an optical network unit, respectively.

The optical line termination OLT of FIG. 2a further comprises k central optical termination units OTU-C1, . . . OTU-Ck, wherein k is the number of optical trees of the network PON. Each unit OTU-C1, . . . OTU-Ck is connected to the root of a respective optical tree. The central optical termination units OTU-C operate as encapsulating and de-encapsulating modules.

The switching matrix SM is connected to each unit OTU-C1, . . . OTU-Ck through a respective number of connections (either physical or logical), which corresponds to the number of optical network units connected to each unit OTU-C1, . . . OTU-Ck through the respective optical tree. For instance, in FIG. 2a, the switching matrix SM and the unit OTU-C1 are connected through three connections (either physical or logical), under the assumption that the unit OTU-C1 is connected to three optical network units (not shown). Besides, the switching matrix SM and the unit OTU-Ck are connected together through two connections (either physical or logical), under the assumption that the unit OTU-C2 is connected to two optical network units (not shown).

Each central optical termination unit OTU-C1, . . . OTU-Ck is connected to the root of the respective optical tree by means of a respective user-side port upOLT1, . . . , upOLTk.

The functions of the switching matrix SM and of the central optical termination units OTU-C1, . . . OTU-Ck will be described herein after with reference to FIG. 3.

Figure 2B:
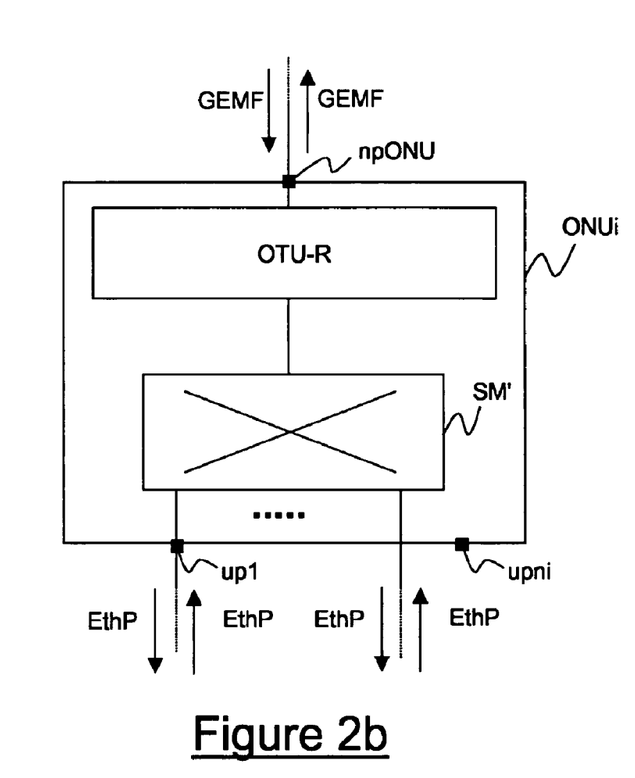

FIG. 2b schematically shows the structure of an exemplary optical network unit, indicated in FIG. 2b as ONUi. Also optical network unit ONUi, as OLT, is a network interface apparatus.

The optical network unit ONUi comprises a network-side port npONU which is connected to a remote optical termination unit OTU-R, whose function will be explained herein after by referring to FIG. 3. The remote optical termination units OTU-R operate as encapsulating and de-encapsulating modules. Such a remote optical termination unit OTU-R is connected to a switching matrix SM'. Switching matrix SM' has an input connected to the remote optical termination unit OTU-R and ni outputs, each output being connected to a respective user-side port up1, . . . , upni, wherein ni is the number of users connected to the optical network unit ONUi. Each user-side port up1, . . . , upni is connected to a respective user (not shown).

By referring to FIG. 3, the transmission of an upstream data packet from a source user uij to the packet-switched network PN through the passive optical network PON will now be described. As the transmission of a downstream data packet from the packet-switched network to a destination user is similar, it will not be explicitly described.

Figure 3:
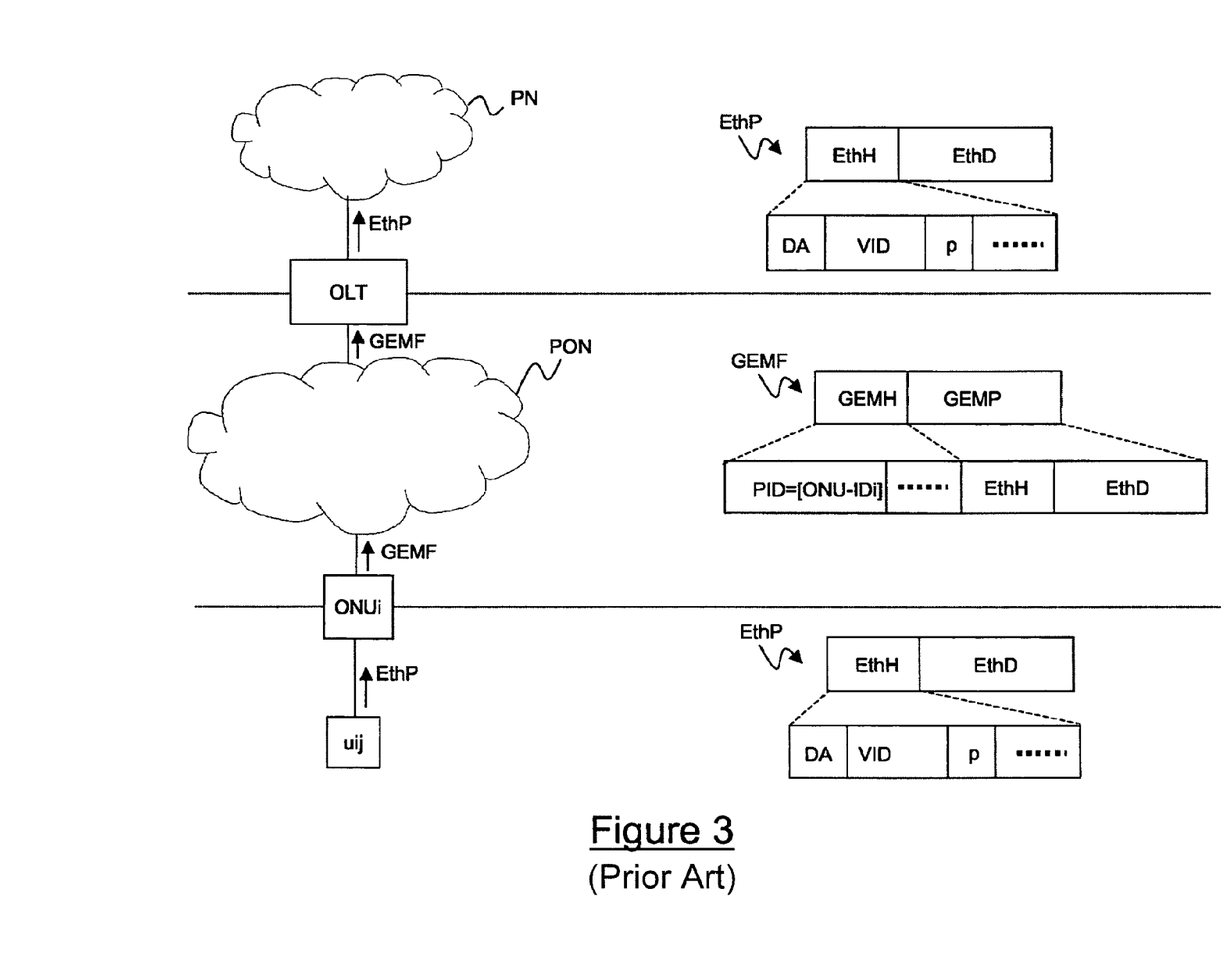
FIG. 3 schematically shows the principle of GEM encapsulation of an upstream Ethernet packet, according to the prior art.

It is assumed that the packet-switched network PN of FIG. 3 is an Ethernet network. Thus, the packet to be transmitted is an Ethernet packet EthP. It is further assumed that the passive optical network PON of FIG. 3 is a GPON network, which transports Ethernet packets through GEM encapsulation.

As already mentioned, the passive optical network PON is connected to the packet-switched network PN through the optical line termination OLT. For simplicity, it is assumed that the network PON comprises a single optical tree, so that the optical line termination OLT comprises a single central optical termination unit OTU-C (not shown in FIG. 3).

Further, as already mentioned, the passive optical network PON is connected to the source user uij by means of an optical network unit ONUi. For simplicity, other users connected to the unit ONUi are not shown in FIG. 3. Further, the other m−1 optical network units connected to the termination OLT are not shown in FIG. 3.

As it is known, an upstream Ethernet packet EthP is received from the source user uij by the optical network unit ONUi. The optical network unit ONUi inserts the packet EthP into a GEM frame GEMF and transmits the GEM frame GEMF through the network PON in its dedicated transmission period. The optical line termination OLT receives such a frame GEMF, it extracts the packet EthP from the frame GEMF and, thanks to switching information comprised into the packet EthP, it properly switches the packet EthP to the packet-switched network PN.

More in detail, the packet EthP comprises a header EthH and user data EthD. The header EthH comprises various information for switching the Ethernet packet EthP in an Ethernet network. As already mentioned, the header EthH for instance comprises:

a destination address field DA, comprising the MAC address of the destination user uij;

a VLAN Identifier field VID, comprising the VLAN identifier of the Ethernet packet EthP; and a priority field p, comprising the priority value of the Ethernet packet EthP.

The header EthH comprises further fields, which are not described as they are not relevant to the present invention.

Upon reception of the Ethernet packet EthP through the appropriate user side port upni (not shown in FIG. 3), the switching matrix SM' of the optical network unit ONUi switches the packet EthP to its remote optical termination unit OTU-R. Therefore, the switching matrix SM' substantially acts as an Ethernet switch with ni inputs and a single output.

The remote optical termination unit OTU-R then encapsulates the Ethernet packet EthP in a GEM frame GEMF. More particularly, the remote optical termination unit OTU-R inserts the packet EthP, possibly except some fields, into the payload GEMP of a frame GEMF. Besides, the remote optical termination unit OTU-R inserts into the Port-ID field PID of the GEM header GEMH of the frame GEMF an appropriate value. For instance, such a value is one of the Port-ID values associated to the optical network unit ONUi (indicated as ONU-IDi in FIG. 3).

Finally, the optical termination unit OTU-R electro-optically converts the frame GEMF, and it transmits it through the passive optical network PON during its dedicated transmission period.

The optical line termination OLT, upon reception of the frame GEMF, opto-electrically converts it, by means of its central optical termination unit OTU-C. Then, the central optical termination unit OTU-C extracts the Ethernet packet EthP from the payload GEMP of the frame GEMF, and forwards it to the switching matrix SM. The connection through which the Ethernet packet EthP is sent from the central optical termination unit OTU-C to the switching matrix SM depends on the value of the Port-ID field PID. The switching matrix SM', according to the value of the MAC address comprised into the destination address field DA, properly switches the Ethernet packet EthP towards the packet-switched network PN. Therefore, the switching matrix SM substantially is an Ethernet switch with a m inputs and a single output.

From the above description of FIG. 3, it can be noticed that the known GEM encapsulation does not take into any account the precedence of the Ethernet packet Eth, which may be indicated by the VLAN Identifier field VID and/or by the priority field p.

Indeed, according to the prior art, an Ethernet packet EthP is simply inserted into the payload of a GEM frame, and nor its priority neither its VLAN Identifier or any other information relating such an Ethernet packet is processed during GEM encapsulation.

Figure 4:
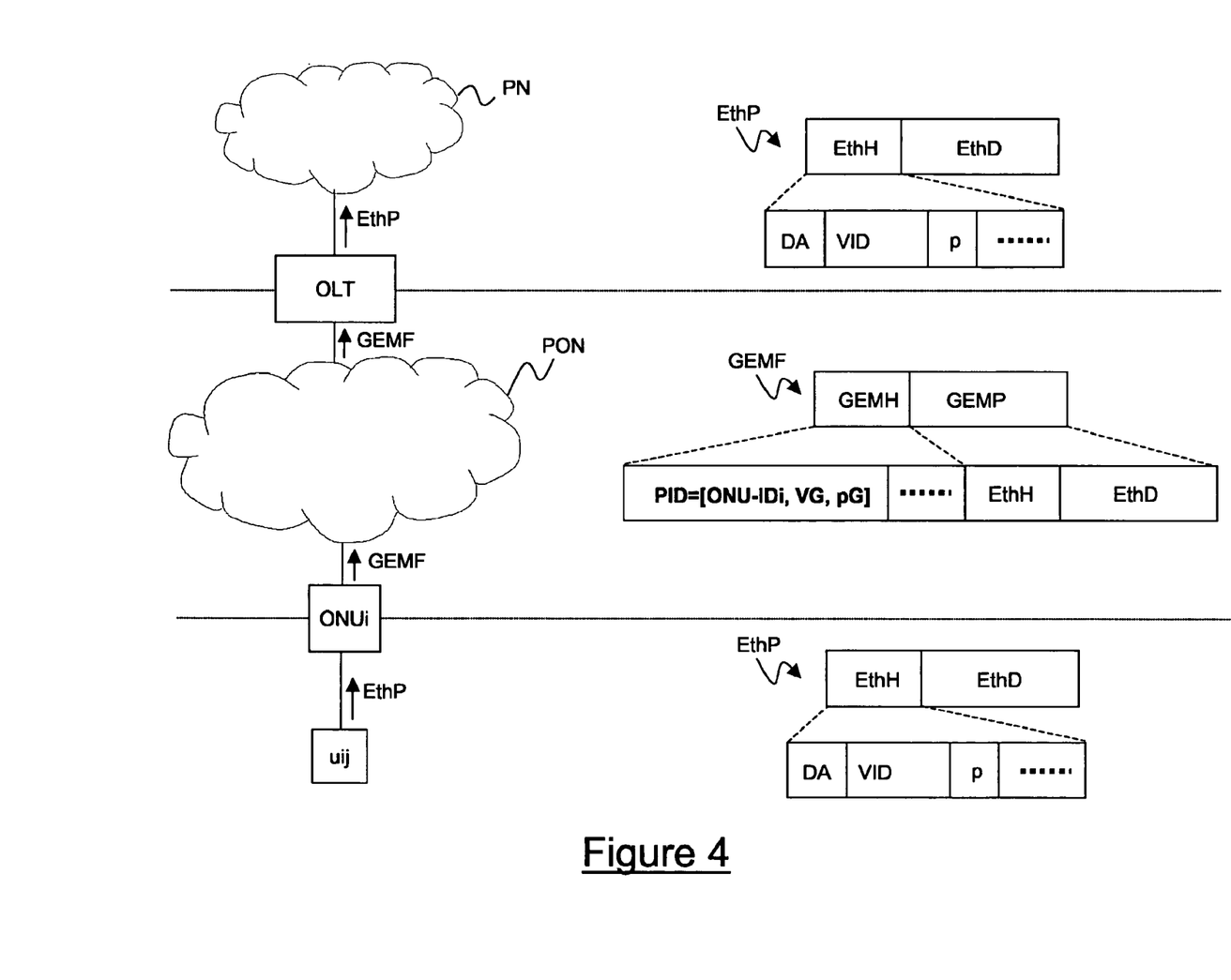
FIG. 4 schematically shows the principle of GEM encapsulation of an upstream Ethernet packet, according to an embodiment of the present invention.

FIG. 4 shows a method of transmitting data packets with different precedence through a passive optical network according to an embodiment of the present invention.

As in FIG. 3, the packet-switched network PN is supposed to be an Ethernet network; thus, data packets to be transmitted are Ethernet packets. Besides, the passive optical network of FIG. 4 is a GPON network, which is adapted to transport Ethernet packets through GEM encapsulation.

The optical network unit ONUi receives the Ethernet packet EthP from the source user uij, and it encapsulates it into a GEM frame GEMF.

However, advantageously, according to the present invention, the unit ONUi inserts into the header GEMH of the frame GEMF a value indicative of the precedence of the Ethernet packet EthP, as it will be explained in greater detail herein after. Further, according to the present invention, the optical network unit termination ONUi requests to the optical line termination OLT to allocate resources of the passive optical network PON for transmitting the frame GEMF according to said value indicative of the precedence of the Ethernet packet Ethp. The optical network unit ONUi then transmits the frame GEMF through the passive optical network PON. The optical line termination OLT receives such a frame GEMF, and, thanks to information comprised into the frame GEMF, determines that such a frame GEMF comprises data coming from the optical network unit ONUi. Thus, the termination OLT extracts the Ethernet packet EthP from the frame GEMF and, thanks to switching information comprised into the Ethernet packet EthP, it properly switches the packet EthP to the packet-switched network PN.

In greater detail, the Ethernet packet EthP comprises a header EthH and user data EthD. The format of the Ethernet packet EthP is similar to the one shown in FIG. 3, therefore a detailed description will not be repeated. It is only mentioned that the Ethernet packet EthP comprises a priority field p, which comprises a priority value for the Ethernet packet EthP, and a VLAN Identifier field VID, which comprises the VLAN identifier of the Ethernet packet EthP.

Upon reception of the Ethernet packet EthP, the switching matrix SM' of the optical network unit ONUi switches the Ethernet packet EthP to the remote optical termination unit OTU-R (not shown in FIG. 4). Therefore, the switching matrix SM' substantially acts as an Ethernet switch with ni inputs and a single output.

The remote optical termination unit OTU-R then encapsulates the received packet EthP into a GEM frame GEMF. More particularly, the remote optical termination unit OTU-R inserts the Ethernet packet EthP, except some fields, into the payload GEMP of a frame GEMF.

While according to the prior art shown in FIG. 3 the remote optical termination unit OTU-R simply inserts into the header of the GEM frame (and in particular into the Port-ID field PID of the GEM frame) information for routing the GEM frame (i.e. a Port-ID value ONU-IDi of the unit ONUi), according to the present invention the remote optical termination unit OTU-R inserts into the header of the GEM frame a value which is also indicative of the precedence of the Ethernet packet.

According to a preferred embodiment of the present invention, such a value indicative of the precedence of the Ethernet packet is inserted into the Port-ID field PID of the GEM frame. This advantageously allows to associate the precedence value of the Ethernet packet to an appropriate Transmission Container. In fact, as already mentioned, each value of the Port-ID field may be associated to a Transmission Container Type.

Thus, for instance, according to the present invention, a low precedence Ethernet packet is inserted into a GEM frame whose Port-ID field comprises a value which is associated to a low bandwidth assurance Transmission Container Type (for instance Type 3 or Type 4). Similarly, a high precedence Ethernet packet is inserted into a GEM frame whose Port-ID field comprises a value which is associated to a high bandwidth assurance Transmission Container Type (for instance Type 1 or Type 2). According to the present invention, different solutions can be implemented; in any case, Ethernet packets with lower precedence should be transported by GEM frames inserted in Transmission Containers with lower bandwidth assurance than Ethernet packets with higher precedence.

Thus, while according to the prior art GEM frames are all statically associated to the same Transmission Containers, according to the present invention each GEM frame is dynamically associated to a proper Transmission Container, as the Port-ID field content is dynamically estimated for each GEM frame according to the precedence value of the encapsulated Ethernet packet.

For instance, FIG. 4 shows an embodiment of the method according to the present invention. According to this embodiment, during GEM encapsulation, the optical network unit ONUi inserts into the Port-ID field PID of the GEM frame the following value: [ONU-IDi, VG, pG], wherein:

ONU-IDi a value identifying the optical network unit ONUi;

VG is a value indicative of the VLAN Identifier of the Ethernet packet EthP; and pG is a value indicative of the Ethernet packet priority value p.

Thus, according to the present invention, the Port-ID field is indicative not only of the ONUi from which the frame GEMF is transmitted, but it is indicative also of the precedence (i.e. priority and VLAN Identifier) of the Ethernet packet transported by the GEM frame. This advantageously allows to support VLAN tagging option also during propagation along the passive optical network PON.

For instance, it is assumed that 32 optical network units ONU are connected to a same optical line termination OLT. Thus, for identifying each optical network unit, at least 5 bits of the Port-ID field are required for associating to each optical network unit at least one value of Port-ID. Besides, it assumed that 3 bits of the Port-ID field are required in order to write the priority pG, which is indicative of the Ethernet packet priority p. Therefore, 12-5-3=4 bits of the Port-ID field are left available for writing the VLAN identifier VG. This implies that if a service providers wishes to assign different VLAN Identifiers to different types of services (VLAN tagging per service), the service provider will be able to offer $2^4=16$ types of services supported by VLAN tagging option.

According to the present invention, the remote optical transport unit OTU-R, according to the value of the Port-ID field PID, asks the central optical termination unit OTU-C to allocate the appropriate resources for transmitting the frame GEMF over the network PON in the upstream direction.

Finally, the remote optical termination unit OTU-R electro-optically converts the frame GEMF, and it transmits it through the passive optical network PON in its dedicated transmission period.

The optical line termination OLT, upon reception of the frame GEMF, opto-electrically converts it, by means of its central optical termination unit OTU-C.

It has to be remarked that, according to the present invention, the optical network unit ONUi has associated a set of Port-ID field values, each value being indicative both of the optical termination unit and of a precedence of the Ethernet packet transported by the GEMF frame.

The central optical termination unit OTU-C then extracts the Ethernet packet EthP from the payload GEMP of the frame GEMF, and forwards it to the switching matrix SM. The switching matrix SM, according to the value of the MAC address comprised into the destination address field DA, switches the Ethernet packet EthP on its network-side port connected to the packet-switched network PN. Therefore, the switching matrix SM substantially is an Ethernet switch with m inputs and a single output.

Therefore, by comparing FIG. 3 (prior art) and FIG. 4 (showing an embodiment of the present invention), it can be noticed that while according to the prior art the Port-ID field PID is simply indicative of the source optical network unit ONUi of the frame GEMF, according to the present invention the Port-ID field PID is indicative both of the source optical network unit ONUi and of the precedence of the Ethernet packet EthP comprised into the frame GEMF.

Therefore, Ethernet packets with different precedence may be handled in differentiated ways even during transmission over a passive optical network. This advantageously allows to provide service with different Quality of Service. In particular, this advantageously allows to guarantee the Quality of Service to a particular group of users or for a particular service requiring for instance Fixed Bandwidth assurance or Assured Bandwidth assurance, even in case of congestion of the passive optical network.

It can be noticed that, according to the present invention, the value pG indicative of the priority value of the Ethernet packet may comprise less than 3 bits. For instance, it is possible to map the 3-bit priority field p of an Ethernet packet into a 2-bit value pG into the Port-ID field of a GEM frame. This means that different values of the Port-ID field can represent up to 4 different priority values, instead of the eight possible values of the priority field p. In such a case, it is necessary to establish a mapping rule between p and pG. For instance, pG="00" may be indicative of p="000" and "001", pG="01" may be indicative of p="010" and "011" and so on. Of course, this is only an example, and other mapping rules between p and pG are possible.

Figure 5:
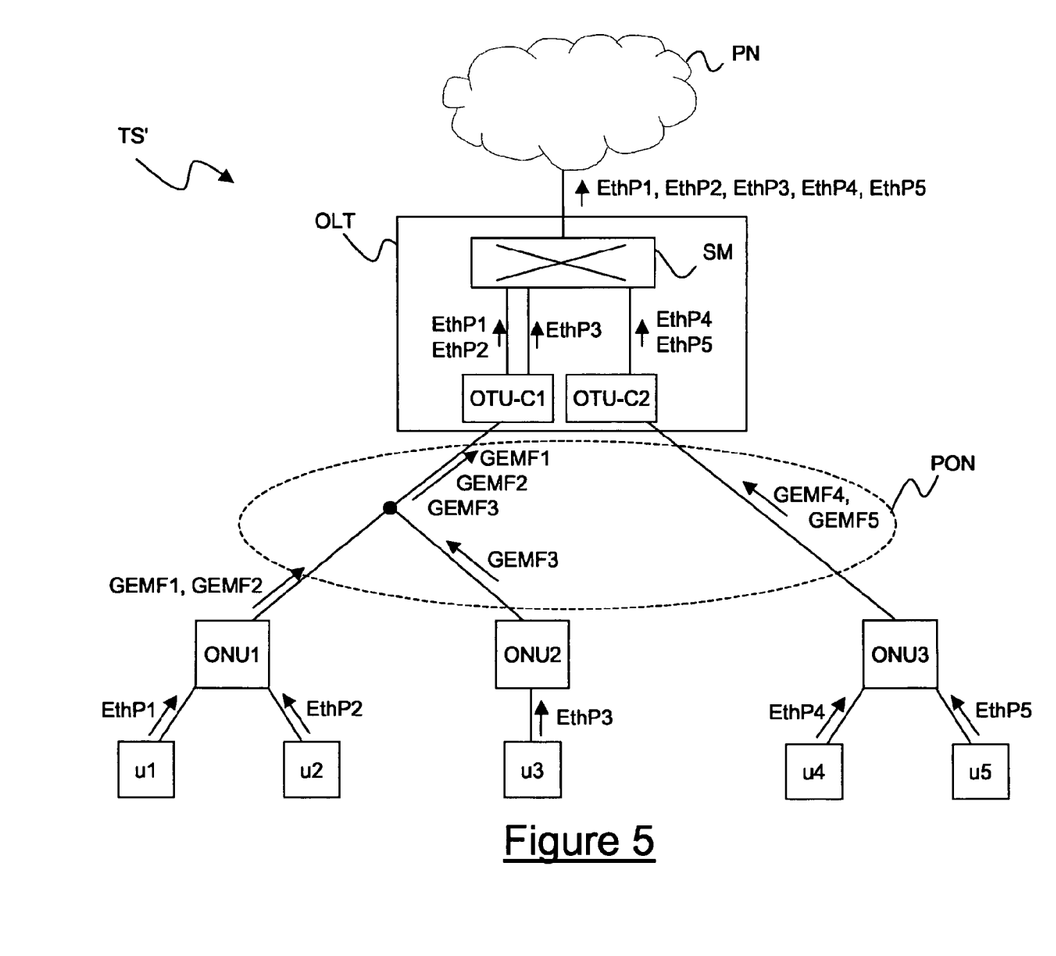
FIG. 5 shows an exemplary transmission system implementing an embodiment of the present invention.

FIG. 5 schematically shows a transmission system TS' implementing the method according to the present invention. Such a transmission system TS' comprises a passive optical network PON for providing five users u1, u2, . . . , u5 with optical access to a packet-switched network PN. It is assumed that the packet-switched network PN is an Ethernet network.

The network PON and the packet-switched network PN are connected together by an optical line termination OLT comprising a switching matrix SM and a first and a second unit OTU-C1 and OTU-C2.

The first unit OTU-C1 is connected, through a first optical tree of the network PON, to two optical network units ONU1 and ONU2. The second unit OTU-C2 is connected, by means of a second degenerate optical tree of the network PON, to a further optical network unit ONU3. Therefore, the switching matrix SM and the first unit OTU-C1 are connected through a first and a second connections (either physical or logical), while the switching matrix SM and the second unit OTU-C2 are connected through a single third connection (either physical or logical).

It is assumed that each user u1, u2, . . . , u5 wishes to transmit a respective upstream Ethernet packet EthP1, EthP2, . . . , EthP5 to the packet-switched network PN.

Figure 6:
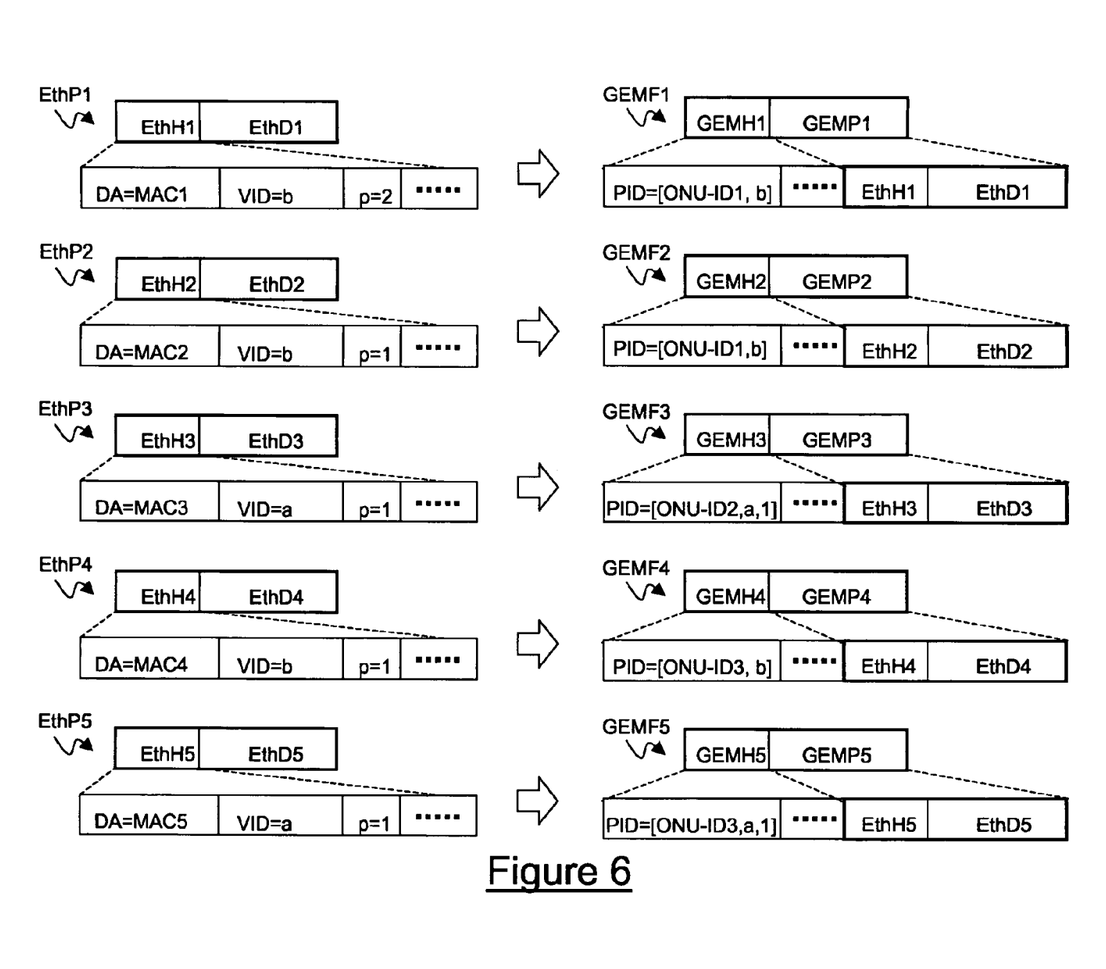
FIG. 6 schematically shows an embodiment of the method of the invention as implemented by the transmission system of FIG. 5.

Thus, as shown in FIG. 6, the destination address field DA of each Ethernet packet EthP1, EthP2, . . . , EthP5 comprises a respective MAC address MAC1, MAC2, . . . , MAC5 of the respective destination users (destination users are connected to the packet-switched network PN, and they are not shown in FIG. 5).

It is assumed that the Ethernet network of FIG. 5 provides two different services. A first service (for instance, video on demand) is identified by a first VLAN Identifier ("a" in FIG. 6), while a second service (for instance, voice over IP) is identified by a second VLAN Identifier ("b" in FIG. 6). For instance, it is assumed that users u1, u2, u4 should be provided with the second service, while user u3, u5 should be provided with the first service. Therefore, the VLAN Identifier field VID of Ethernet packet EthP1 comprises the value "b", the VLAN Identifier field VID of Ethernet packet EthP2 comprises the value "b", the VLAN Identifier field VID of Ethernet packet EthP3 comprises the value "a", the VLAN Identifier field VID of Ethernet packet EthP4 comprises the value "b", while the VLAN Identifier field VID of Ethernet packet EthP5 comprises the value "a".

Besides, each Ethernet packet has a certain priority value. For instance, the priority field p of Ethernet packet EthP1 comprises the value 2 ("p=2" in FIG. 6), while the priority field p of the Ethernet packets EthP2, EthP3, EthP4, EthP5 comprises the value 1 ("p=1" in FIG. 6).

Each Ethernet packet EthP1, EthP2, . . . , EthP5 is transmitted by the respective user u1, u2, . . . , u5 to the optical network unit to which the user is connected. Therefore, the optical network unit ONU1 receives the Ethernet packets EthP1, EthP2, the optical network unit ONU2 receives the Ethernet packet EthP3, and the optical network unit ONU3 receives the Ethernet packets EthP4, EthP5.

The remote optical termination unit OTU-R (not shown in FIG. 5) of each optical network unit encapsulates the received Ethernet packets. In particular, the unit OUT-R of the optical network unit ONU1 encapsulates each Ethernet packet EthP1, EthP2 in respective GEM frames GEMF1, GEMF2. Similarly, the unit OUT-R of the optical network unit ONU2 encapsulates the Ethernet packet EthP3 in a respective GEM frame GEMF3. Similarly, the unit OUT-R of the optical network unit ONU3 encapsulates each Ethernet packet EthP4, EthP5 in respective GEM frames GEMF4, GEMF5.

According to the present invention, the remote optical termination unit OTU-R of the optical network unit ONU1 inserts into the Port-ID field of each GEM frame GEMF1, GEMF2 a value indicative of the precedence of packet EthP1, EthP2, respectively. Similarly, the remote optical termination unit OTU-R of the optical network unit ONU2 inserts into the Port-ID field of the GEM frame GEMF3 a value indicative of the precedence of the packet EthP3. Similarly, the remote optical termination unit OTU-R of the optical network unit ONU3 inserts into the Port-ID field of each GEM frame GEMF4, GEMF5 a value indicative of the precedence of the packet EthP4, EthP5, respectively.

For instance, in the example of FIG. 5, it is assumed that in case of Ethernet packets associated to the second service (identified by the VLAN Identifier "b"), the value of the Port-ID is such that GEM frames encapsulating such Ethernet packets are inserted in T-CONT with the highest bandwidth assurance (for instance, "Fixed Bandwidth") independently of their Ethernet priority. On the other hand, it is assumed that in case of Ethernet packets associated to the first service (identified by the VLAN Identifier "a"), the value of the Port-ID is such that GEM frames encapsulating such Ethernet packets are inserted in different T-CONTs according to their Ethernet priority. This is only an example; other types of mapping rules are possible according to the present invention.

Therefore, the port-ID field PID of GEM frames GEM1, GEM2, GEM4, which transport Ethernet packets associated to the second service "b", has the following format:
GEM frame GEM1: [Port-ID1, b];
GEM frame GEM2: [Port-ID1, b]; and
GEM frame GEM4: [Port-ID3, b].

On the other hand, the port-ID field PID of GEM frames GEM3, GEM5, which transport Ethernet packets associated to the first service "a", has the following format:
GEM frame GEM3: [Port-ID2, a, 1]; and
GEM frame GEM5: [Port-ID3, a, 1].

It can be noticed that Port-ID fields of GEM frames generated by units OTU-R of different optical network units ONU may contain the same value. In fact, a same value of Port-ID field may be used to indicate optical network units connected to different optical trees, since packets coming from a certain optical network unit connected to a given optical tree will not propagate along other optical trees. Thus, this helps increasing the number of possible Port-ID field values that can be associated to a single optical network unit, thus allowing, for instance, to include into the Port-ID field additional information about the transported Ethernet packet.

Moreover, Port-ID fields of GEM frames transporting Ethernet packets transmitted by different users and transported along a same optical tree are not necessarily different. For instance, the Port-ID field PID of GEM frames GEMF1 and GEMF2 comprises the same value, since such frames are transmitted by the same optical network unit ONU1 with the same precedence. However, this does not induce ambiguity in recognizing the packet destination, since packet are de-encapsulated by the optical termination line, and switching is then performed based on the destination MAC address.

Each remote optical network unit OTU-R, according to the present invention, allocates resources for transmitting GEM frames GEMF1, GEMF2, . . . , GEMF5 according to the value of their Port-ID field PID. For instance, as the frame GEMF4 is transporting the packet EthP4, whose precedence is higher than packet EthP5, the unit OTU-R of the unit ONU3 will for instance ask the unit OTU-C2 to allocate a guaranteed bandwidth into the second optical tree for transmitting the frame GEMF4. Therefore, even in case of congestion of such an optical tree, the user u4 will send its Ethernet packets relative to the second service "b" with its expected Quality of Service.

Similarly, since frames GEM1, GEM2 have the same precedence, the unit OTU-R of the optical network unit ONU1 will ask the unit OTU-C1 to equally share the resources of the first optical tree.

Then, the central optical termination unit OTU-C1 receives the frames GEMF1, GEMF2, GEMF3. Then the unit OTU-C1 then extracts the packets EthP1, EthP2, EthP3 from the frames GEMF1, GEMF2, GEMF3. Then, according to the MAC address of such packets, it properly switches the packets EthP1, EthP2, EthP3 to the packet-switched network PN.

Similarly, the central optical termination unit OTU-C2 receives the frames GEMF4, GEMF5. Then the unit OTU-C2 extracts the packets EthP4, EthP5 from the frames GEMF4, GEMF5. Then, according to the MAC address of such a packet, it properly switches the packets EthP4, EthP5 to the packet-switched network PN.

Therefore, according to the present invention, Ethernet packets are handled according to the value of their priority field p and/or of their VLAN Identifier not only by Ethernet switches, but also during their transmission across the passive optical network, so that their precedence is preserved during the whole transmission path between source and destination.

It can be noticed that in the present description, embodiments of the present invention has been described by referring to the upstream transmission of a data packet. However, the method of the invention can be applied in the same manner also to downstream packets, as it will briefly described herein after.

In case of downstream transmission, GEM encapsulation of data packets addressed to users is performed by the units OTU-C comprised into the optical line termination. Therefore, according to the present invention, each unit OTU-C, while encapsulating a downstream data packet having a given precedence value, inserts into the GEM frame encapsulating such a data packet a value indicative of the precedence value of the data packet. Preferably, the unit OTU-C inserts said precedence indicative value into the Port-ID field of the GEM frame.

Further, preferably, the unit OTU-C is adapted to allocate resources for transmitting said GEM frame according to the precedence indicative value, so that the Ethernet packet is handled according to its precedence along the whole transmission path from the source (packet-switched network) to the destination (user).

The invention claimed is:

1. A method of transmitting data packets through a Gigabit capable passive optical network, comprising:
    receiving a first data packet from a first interface of said Gigabit capable passive optical network, said first data packet comprising precedence information;
    encapsulating, based on a Gigabit capable passive optical network encapsulation mode (GEM) encapsulation, said first data packet in a second data packet at said first interface; and
    transmitting said second data packet through said Gigabit capable passive optical network toward a second interface,
    wherein said encapsulating comprises inserting in a port identifier field of a header of said second data packet a value indicative of said precedence information.

2. The method according to claim 1, wherein transmitting comprises allocating resources of said Gigabit capable passive optical network according to said value indicative of said precedence information.

3. The method according to claim 1, wherein said first packet is an Ethernet packet.

4. The method according to claim 3, wherein said precedence information comprises priority of said first packet.

5. The method according to claim 3, wherein said precedence information comprises a virtual LAN identifier of said first packet.

6. The method according to claim 1, wherein said second packet is a Gigabit capable passive optical network encapsulation mode frame.

7. A network interface apparatus for interfacing a packet switched network and a Gigabit capable passive optical network wherein data packets are transmitted, said network interface apparatus comprising:
    a first port configured to receive a first data packet from said packet switched network, said first data packet comprising precedence information;
    an encapsulating module configured to encapsulate, based on a Gigabit capable passive optical network encapsulation mode (GEM) encapsulation, said first data packet in a second data packet; and
    a second port configured to transmit said second data packet through said Gigabit capable passive optical network,
    wherein said encapsulating module is configured to insert in a port identifier field of a header of said second data packet a value indicative of said precedence information.

8. The apparatus according to claim 7, further comprising a resource allocation module configured to allocate resources of said passive optical network according to said value indicative of said precedence information.

9. The apparatus according to claim 7, wherein said first packet is an Ethernet packet.

10. The apparatus according to claim 9, wherein said precedence information comprises priority of said first packet.

11. The apparatus according to claim 9, wherein said precedence information comprises a virtual LAN identifier of said first packet.

12. The apparatus according to claim 7, wherein said second packet is a Gigabit capable passive optical network encapsulation mode frame.

13. A transmission system comprising a packet-switched network, a plurality of users, a Gigabit capable passive optical network, a first network interface apparatus for interfacing said packet-switched network and said Gigabit capable passive optical network, and a second network interface apparatus for interfacing said Gigabit capable passive optical network and at least one of said plurality of users, wherein both said first network interface apparatus and said second network interface apparatus are defined according to the network interface apparatus of claim 7.

* * * * *

UNITED STATES PATENT AND TRADEMARK OFFICE
CERTIFICATE OF CORRECTION

| | | |
|---|---|---|
| PATENT NO. | : 8,401,014 B2 | Page 1 of 1 |
| APPLICATION NO. | : 12/084243 | |
| DATED | : March 19, 2013 | |
| INVENTOR(S) | : Capurso et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1325 days.

Signed and Sealed this
Nineteenth Day of May, 2015

Michelle K. Lee
*Director of the United States Patent and Trademark Office*